(12) United States Patent
Imam et al.

(10) Patent No.: US 7,632,565 B1
(45) Date of Patent: Dec. 15, 2009

(54) POROUS METAL/ORGANIC POLYMERIC COMPOSITES

(75) Inventors: M. Ashraf Imam, Great Falls, VA (US); Bhakta B. Rath, Oakton, VA (US); Teddy M. Keller, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/845,897

(22) Filed: Apr. 28, 1997

(51) Int. Cl.
*B32B 5/18* (2006.01)

(52) U.S. Cl. .............. 428/307.3; 428/319.3; 428/319.7; 428/310.5; 428/312.8; 428/545; 428/547; 428/550; 428/613; 428/615; 428/624; 428/650

(58) Field of Classification Search .............. 428/307.3, 428/310.5, 312.8, 319.3, 321.1, 322.7, 545, 428/547, 550, 615, 650, 319.7, 613, 624
See application file for complete search history.

(56) References Cited

U.S. PATENT DOCUMENTS

| 3,567,176 | A |   | 3/1971  | Johnson      |         |
|-----------|---|---|---------|--------------|---------|
| 3,617,364 | A | * | 11/1971 | Jarema et al.| 428/307.3 |
| 3,707,401 | A | * | 12/1972 | Jarema et al.| 428/307.3 |
| 3,955,019 | A |   | 5/1976  | Keith        |         |
| 3,965,448 | A |   | 6/1976  | Browning     |         |
| 3,967,150 | A |   | 6/1976  | Lien et al.  |         |
| 4,165,400 | A |   | 8/1979  | DeMarco      |         |
| 4,569,821 | A |   | 2/1986  | Duperray et al. |      |
| 4,605,595 | A |   | 8/1986  | Tsang et al. |         |
| 4,713,277 | A | * | 12/1987 | Akiyama et al. | 428/131 |
| 4,732,818 | A |   | 3/1988  | Pratt et al. |         |
| 4,759,000 | A |   | 7/1988  | Reitz        |         |
| 5,045,636 | A |   | 9/1991  | Johnasen et al. |      |
| 5,064,045 | A |   | 11/1991 | Leon         |         |
| 5,222,561 | A |   | 6/1993  | Fisher et al.|         |
| 5,347,643 | A |   | 9/1994  | Kondo et al. |         |
| 5,422,177 | A |   | 6/1995  | Fukuda et al.|         |
| 5,459,114 | A |   | 10/1995 | Kaya et al.  |         |
| 5,489,492 | A |   | 2/1996  | Asami et al. |         |
| 5,508,334 | A |   | 4/1996  | Chen         |         |
| 5,516,592 | A |   | 5/1996  | Yang et al.  |         |

OTHER PUBLICATIONS

English Translation of JP 08-245810, Sugimoto et al, "Wet Friction Material", Sep. 24, 1996.*
The article "Specific Gravity of Major Polymers", copyright (c) 1997, 2 pages.*

* cited by examiner

*Primary Examiner*—Hai Vo
(74) *Attorney, Agent, or Firm*—John J. Karasek; Joseph T. Grunkemeyer

(57) ABSTRACT

Metal foams are impregnated with resins. The metal foam/polymer composite formed upon curing has excellent acoustic dampening and structural properties. Foams of various metals, such as aluminum, titanium, nickel, copper, iron, zinc, lead, silver, gold, platinum, tantalum, and alloys based on these metals, may be used. The polymer component may be any polymeric resin, for example, epoxy, natural rubber, acrylic, or phenolic.

28 Claims, 16 Drawing Sheets

POROUS METAL/ORGANIC POLYMERIC COMPOSITES

BACKGROUND OF THE INVENTION

1. Field of the Invention

The present invention relates generally to metal composites and more particularly to metal/polymer composites.

2. Description of the Background Art

In many cases, such as in factories, motor vehicles, ships, and submarines, it is desirable to absorb as much noise as possible. In factories, absorbance of machinery noises can minimize noise pollution caused by industrial sounds. In motor vehicles, absorbance of engine noises and noises from road vibration enhances driver and rider comfort. In submarines and ships, the absorbance of machinery sounds helps prevent detection and identification by unfriendly forces. Additionally, in regions where earthquakes are common, the structural components of buildings, bridges, and similar artifacts must not only be strong, but should be able to dampen vibrations.

Past noise reduction efforts have previously taken one of two approaches. The use of soft coupling components (e.g., bushings, pads) to isolate machinery, and the incorporation of structural acoustic damping materials.

Both of these prior art approaches have had drawbacks. Soft coupling components add weight to a device, may require maintenance, and may not be consistent with the required design and performance features. Currently available acoustic damping materials do not exhibit adequate acoustic behavior over broad ranges of temperature, lack the required strain amplitude and frequency, or do not have the desired strength and environmental resistance.

Significant advances have been made to increase the strength and stiffness of lightweight materials. Examples of these developments include the superior density-normalized strength and stiffness of Al—Li, hard dispersion strengthened aluminum and titanium, aluminides, and whisker or fiber reinforced aluminum and magnesium. Although those materials have excellent structural characteristics, the demand continues for high strength, lightweight structural materials that also vastly improve damping capability.

U.S. Pat. No. 4,759,000, the entirety of which is incorporated herein by reference for all purposes, to Ronald P. Reitz describes acoustically transparent windows made of an aluminum/nickel foam impregnated with an acoustically non-absorbent rubber such as BE silicone rubber RTV-11. Nothing in that patent teaches or suggests that a useful material may be obtained by impregnating a metal foam with an acoustically absorptive polymer.

SUMMARY OF THE INVENTION

Accordingly, it is an object of this invention to produce a light structural materials having good structural and acoustic damping properties.

It is another object of the present invention to reduce noise derived from the operation of machinery.

It is a further object of the present invention to acoustically isolate internal areas of a structure from their surrounding environment.

These and other objects are achieved by impregnating a metal foam with a polymer.

BRIEF DESCRIPTION OF THE DRAWINGS

A more complete appreciation. of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

Figure 1:
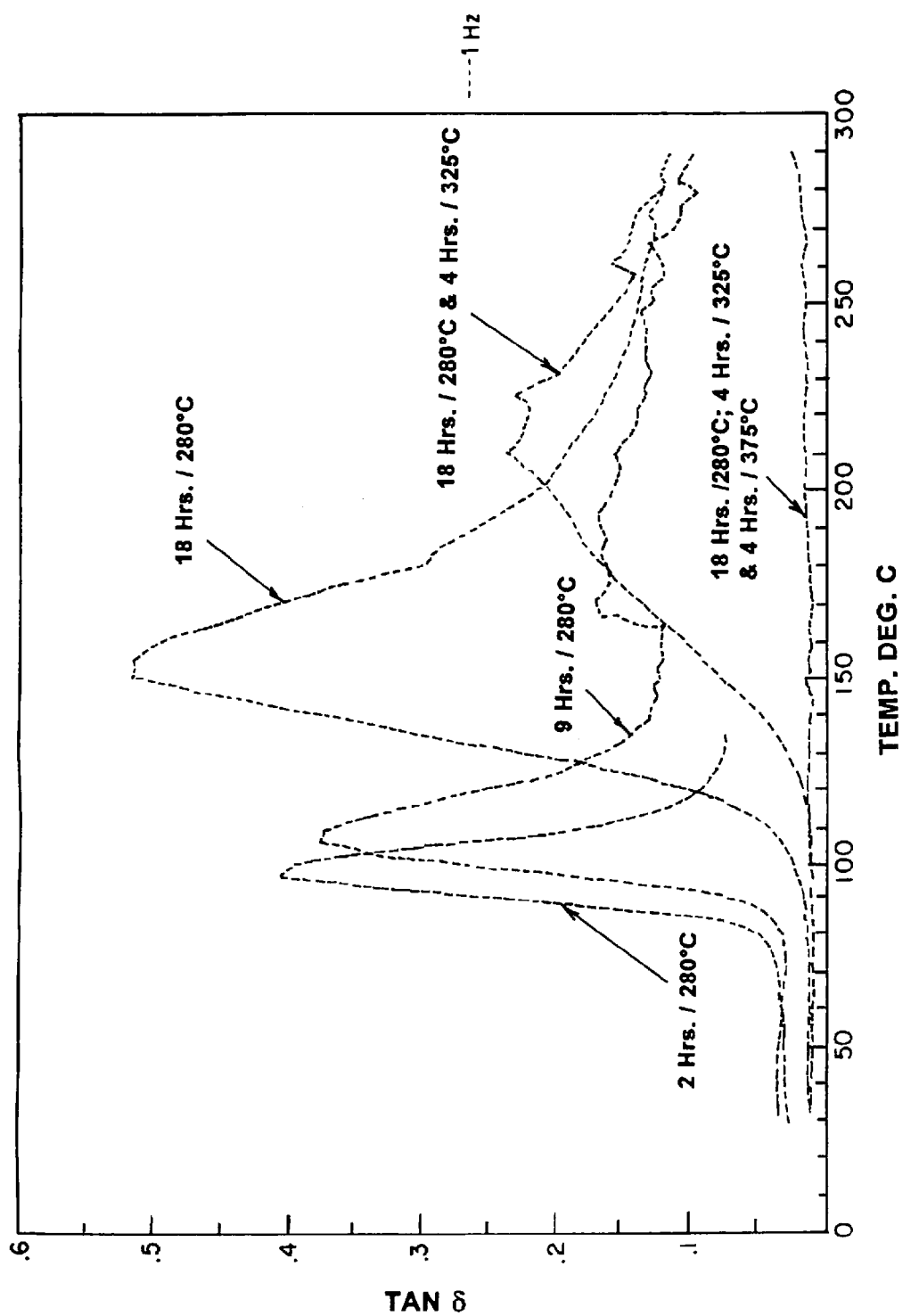
FIG. 1 shows the acoustic damping behavior of an aluminum alloy foam/phthalonitrile composite, heat treated under the various condition described in the accompanying Example 3.

The metal foam of the present invention may be any porous metal foam, regardless of shape or percent density, having an open cell structure that permits impregnation with an uncured polymer. Particularly useful metals include aluminum, titanium, nickel, copper, iron, zinc, lead, silver, gold, platinum, tantalum, and alloys (including steel) based on these metals. Other metals may also be used. Aluminum and titanium and alloys thereof are particularly useful because of their low density.

Metal foams may be produced by a variety of known methods. For example, a molten metal may be placed under high pressure so that it dissolves a non-reactive gas. When the pressure is released and the metal is allowed to cool, the dissolved gas escapes and leaves open-celled pores in the metal body. In other processes, foaming agents are added to molten metal. Another process mixes monomers with metal particles and heats the mixture to induce foaming and solidification of the resin. As used herein, the term "resin" encompasses prepolymers, monomers, and mixtures thereof. A "cured resin" is the cured polymer. With further heating, the metal particles consolidate and the polymer hydrolyzes. U.S. Pat. No. 4,569,821, the entirety of which is incorporated herein by reference for all purposes, improves upon that process by substituting a stabilized hydrogel for the monomers, allowing more complete pyrolysis of the organic components during formation of the metal foam.

In a foam, pore size is defined as the number of pores per linear unit length. Because foams have only thin ligaments between the pores, the void diameter of a pore is approximately the reciprocal of the pore size of the foam. Decreasing the void diameter increases the contact surface area between the metal foam and the polymer. Also, as the percent foam density (% Foam Density=Density of a One Unit Volume of Foam/Density of One Unit Volume of Metal×100) of the metallic foam decreases, the final product increasingly exhibits the structural characteristics of the polymer material. Thus, as the percent foam density of the metallic foam decreases, the stiffness of the composite decreases. Even with extremely low percent foam densities, however; the stiffness of the composite is superior to that of either of the individual components. Percent foam density and pore size also determine the number of polymer/metal interfaces that an acoustic vibration must traverse. As explained below, the polymer/metal interfaces contribute mainly to the sound damping capabilities of the composites of the present invention. A typical useful pore size is 5-100 pores/inch. More often, a pore size of about 10-50 pores/inch is used, and most often a pore size of about 10-40 pores/inch is used. Typically, the percent foam density is about 5-40. More often, the percent foam density is about 8-10.

Typically, to improve the predictability of the structural and acoustic properties of the composite products of the present invention, the pores (also referred to in the present specification and claims as "cells") within the metal foam have a locally uniform size and distribution. Throughout the present specification and claims, a foam has a locally uniform size and distribution of pores if most of the pores of the foam are surrounded by evenly distributed pores having approximately the same void diameter as the surrounded pore. Local non-uniformity in the size or distribution of the pores within the metal foam decreases the ability to predict the characteristics of the resulting composite. If desired, the metal foam may be divided into regions of different pore size, or may have a gradation of pores sizes in any direction along the metal foam, while maintaining locally uniform pore size, without harming the predictability of performance.

The metal foam may be impregnated by any available method. Typically, the metal foam is impregnated by contacting it with a resin component. The resin component may be a neat resin or a neat blend of resins, or may include any catalysts, curing agents, or additives desired. The resin component may be a powder (of sufficiently small particle size to penetrate the pores of the metal foam), a melt, a room temperature liquid, or a solution, and may include mixtures of several prepolymers and/or monomers. A vacuum or positive pressure may be applied to assist the penetration of the resin component into the metal foam. Solvent, if present, is removed by evaporation. The resin component is then converted (solidified or consolidated by any method, typically heating to polymerize and/or cure the resin, or cooling to solidify a molten resin) to a solid bulk polymer (partially crosslinked, fully crosslinked, or non-crosslinked) that fills or partially fills the open-cells of the metal foam.

The viscosity of the resin component (i.e., the impregnant) can be adjusted both thermally or by adjusting the amount of any solvent used, if necessary. Preferably, the impregnant viscosity should be selected to allow the metal foam to be completely impregnated with the resin component under practical processing conditions. A high impregnant viscosity may restrict the ability of the resin component to completely penetrate the open porous structure of the metal foam. This problem may be overcome by forcing, under positive pressure, the resin component into the pores of the foam. For any given impregnant used, an appropriate impregnant viscosity may be selected empirically, without undue experimentation, given the guidance provided by this specification and the accompanying examples. Resin component in powder form can be forced into the pores of the metal foam by any method. For example, the powdered resin component may be poured on top of the metal foam, and positive or negative pressure may be applied to the powder, forcing it into the pores of the foam. At the same time, the metal foam may be vibrated to aid in impregnation.

The polymeric component of the present invention is typically selected to have high intrinsic acoustic damping. Basically, the acoustic damping ability of a polymer is determined by its dynamic modulus at a given frequency. In the case of rubber materials, the acoustic damping ability of unhardened rubbers is significantly greater than that of hardened or fully hardened rubbers. In general, thermoplastics and thermosets, unlike elastomers, provide excellent results when used according to the presently claimed invention, whether cured or uncured.

Polymers particularly useful in the present invention include phthalonitriles, epoxies, acrylics, silicones, polyurethanes, polyimides, polyvinyls, polycarbonates, natural rubbers, synthetic rubbers, phenolics, polyolefins, polyamides, polyesters, fluoropolymers, poly(phenylene ether ketones), poly(phenylene ether sulfones), poly(phenylene sulfides) and melamine-formaldehyde resins.

The acoustic damping capabilities of the composite of the present invention arise in part from the acoustic properties of the polymerized resin component and in part from dissipation of energy at the polymer/metal interface. Energy is never transferred without loss at interfaces between different materials. Therefore, as the number of interfaces that an acoustic vibration must traverse increases, the percentage of dissipated acoustic energy also increases. A metal foam/polymer composite provides numerous interfaces between the polymer and the metal matrix.

Additionally, relative motion between the polymer and metal at their interfaces increases the loss of acoustic energy at these interfaces. Thus, the acoustic damping properties of a polymer/metal matrix composite may be improved, in some cases, by forming the composite under conditions that avoid or minimize chemical or bonding between the metal and the polymer component. Bonding between the polymeric component and the interface may be controlled by the combination of metal and polymeric agent selected, the choice of curing agent and/or curing mechanism, and the application of a release agent, if any, to the metal foam before impregnation with resin component. In other cases, however, vibration of a bond between a metal foam and a polymer may be a loss mechanism that increases acoustical damping across the desired frequency range.

For acoustic damping applications, the composite of the present invention should provide a sufficient number of polymer/metal interfaces to allow good acoustic damping. Thus, particularly when formed as a sheet for acoustic damping applications, the smallest dimension of the metal foam (for a sheet, the thickness) is usually at least about 1.5 times the average void diameter of the metal foam. In many cases, for acoustic damping applications, the smallest dimension of the metal foam will be three or more times greater than the average void diameter of the metal foam.

Also, acoustic damping in these materials might be further improved by the inclusion of polymer/gas and/or gas/metal interfaces, which further increase the number of interfaces that an acoustic vibration must traverse through the composite. These polymer/gas and/or gas/metal interfaces may be formed by many mechanisms, such as the use of a foamed resin component to produce the polymeric component of the composite, the dissolution of the neat resin or blend of resins in a solvent before impregnation, or the inclusion of minute amounts of gas, or materials that form a gas or a vapor during curing, within the resin component used to form the polymeric component. The amount of gas or gas forming materials should be sufficient to significantly enhance the acoustic damping capabilities of the composite, but should not provide sufficient gas to essentially destroy the structural integrity of the composite and/or the polymeric component thereof. The optimum amount of any gas or gas producing agent used in the resin component will vary depending upon the desired use for the composite and may be empirically determined without undue experimentation.

The interaction of the metal foam and the polymer matrix also contributes to the structural strength of the composite. Consequently, the structural strength of the metal foam/polymer composite is greater than the individual structural strengths of the metal foam and the polymer.

Composites according to the present invention may be constructed to exhibit acoustic damping across a frequency band residing within a range of typically about 0.001-80 kHz. The precise frequency band, as well as the bandwidth over which a composite according to the present invention exhibits acoustic damping, is determined by the selected polymer, metal, pore size and percent foam density. The frequency range of damping may be extending by stacking together metal foam/polymer composites having different pore sizes, percent metal foam densities, polymers and/or metals. Several sheets may be laminated together with adhesive, or in some cases will bond to each other during curing of one or more of the polymers within the metal foams, to form a laminate. Pore size and percent metal foam density may also be varied, without stacking, by providing a metal foam having regions of different average pore size or having an average pore size that is graded in one or more directions. It may also be possible to vary the polymer used within a single sheet. For example, a foam may be impregnated with a first resin component. The resin component-impregnated foam may then be subjected to pressure on, for example its upper surface, to force any portion of the first resin component out in the upper portion of the metal foam down into the lower portion. The resin component-impregnated foam may then be solidified while under this positive pressure. After partial or complete consolidation or solidification of the first resin component in the lower portion of the metal foam, the upper portion of the metal foam may be impregnated with a second resin component.

Aside from enhanced performance, components manufactured using composites according to the present invention may alter the noise properties of machinery, aerospace vehicles, domestic vehicles, military vehicles, commercial vehicles, marine vehicles and maritime vehicles. Also, composites according to the present invention are readily manufactured, for example, by resin transfer molding (RTM), resin infusion molding, or resin injection molding.

Having described the invention, the following examples are given to illustrate specific applications of the invention including the best mode now known to perform the invention. These specific examples are not intended to limit the scope of the invention described in this application.

EXAMPLES

Example 1

Preparation of Phthalonitrile Prepolymer

Phthalonitrile monomer, 4,4'-bis(3,4-dicyanophenoxy)biphenyl, was purchased from Daychem Laboratories. 10 g of the monomer was placed in an aluminum planchet and melted on a hot plate at 250° C. (monomer melts around 235° C.). The monomer melt was degassed for about 2 h to eliminate trace amounts of solvent present. The phthalonitrile prepolymer was synthesized by adding 0.15-0.168 g (1.5-1.68 wt %) of 1,3-bis(3-aminophenoxy)benzene, obtained from National Starch Corporation, to the monomer melt. The melt was stirred for 15 min. and was used for fabrication of phthalonitrile/metal foam composite specimens.

Example 2

Fabrication of Phthalonitrile/Aluminum Foam Composite

An aluminum mold, 2×0.6"×0.2", coated with a teflon mold release agent was used for fabrication of composite specimens. Two aluminum foam strips (1"×0.5"×0.185", density 6-8% of the solid material, pore size—40 pores per inch (ppi)) separated by a teflon film, were placed in the mold and heated to 250° C. Approximately 2-3 g of the prepolymer melt synthesized as described above in Example 1 with 1.68 wt % curing additive was poured over the metal foam and degassed for about 15 min. with periodic venting to ensure a good flow of the resin throughout the metal foam. The mold was then heated in an air circulating oven for 9 h at 280° C. and cooled back to room temperature over a 3 h span. The composite samples made with this prepolymer showed an incomplete penetration of the resin into the metal foam. Therefore, subsequent composite fabrications involved a slower curing prepolymer made with 1.5% curing additive. The prepolymer has an initial lower viscosity.

Example 3

Fabrication of Phthalonitrile/Aluminum Foam Composite

An aluminum mold, 2"×0.6"×0.2", coated with a teflon mold release agent was used for fabrication of composite specimens. Two aluminum foam strips (1×0.5"×0.185", density 6-8% of the solid material, pore size—40 ppi) separated by a teflon film, were placed in the mold and heated to 250° C. Approximately 2-3 g of the prepolymer melt synthesized with 1.5 wt % curing additive was poured over the metal foam and degassed for about 15 min. with periodic venting to ensure a good flow of the resin throughout the metal foam. The mold was then heated in an air circulating oven for 9 h at 280° C. and cooled back to room temperature over a 3 h span. The composite samples made with this prepolymer showed a complete penetration of the resin through the metal foam. The mechanical and damping properties of the phthalonitrile/aluminum composite samples were evaluated after heat treatment at the following conditions: (A) 9 h at 280° C. (B) 18 h at 280° C. (C) 18 h at 280, 4 h at 325° C. and (D) 18 h at 280, 4 h at 325, 4 h at 375° C. Conditions (C) and (D) employed an inert atmosphere purge of argon.

Example 4

Fabrication of Phthalonitrile/Copper Foam Composite

An aluminum mold, 2"×0.6"×0.2", coated with a teflon mold release agent was used for fabrication of composite specimens. Two copper foam strips (1"×0.5"×0.185", density 6-8% of the solid material, pore size—10 ppi), separated by a teflon film, were placed in the mold and heated to 250° C. The prepolymer melt synthesized as described above in Example 1 with 1.5 wt % curing additive was poured over the metal foam and degassed with periodic venting to ensure a good flow of the resin. throughout the metal foam. The mold was then heated in an air circulating oven for 9 h at 280° C. and cooled back to room temperature over a 3 h span. The mechanical and damping properties of the phthalonitrile/copper composite samples were evaluated after heat treatment at the following conditions: (A) 9 h at 280° C. (B) 18 h at 280° C. (C) 18 h at 280, 4 h at 325° C. and (D) 18 h at 280, 4 h at 325,4 h at 375° C. Conditions (C) and (D) employed an inert atmosphere purge of argon.

Example 5

Fabrication of Phthalonitrile/Titanium Foam Composite

An aluminum mold (2"×0.6"×0.2", density 6-8% of the solid material, pore size—10 ppi) coated with a teflon mold release agent was used for fabrication of composite specimens. Two titanium foam strips, 1"×0.5"×0.185"×0.185", separated by a teflon film, were placed in the mold and heated to 250° C. The prepolymer melt synthesized as described above in Example 1 was poured over the metal foam and degassed for about 15 min. with periodic venting to ensure a good flow of the resin throughout the metal foam. The mold was then heated in an air circulating oven for 9 h at 280° C. and cooled back to room temperature over a 3 h span. The mechanical and damping properties of the phthalonitrile/titanium composite samples were evaluated after heat treatment at the following conditions: (A) 9 h at 280° C. (B) 18 h at 280° C. (C) 18 h at 280, 4 h at 325° C. and (D) 18 h at 280, 4 h at 325,4 h at 375° C. Conditions (C) and (D) employed an inert atmosphere purge of argon.

Example 6

Fabrication of Phthalonitrile/Zinc Foam Composite

An aluminum (mold, 2"×0.6"×0.2", density 6-8% of the solid material, pore size—10 ppi) coated with a teflon mold release agent was used for fabrication of composite specimens. Two zinc foam strips, 1"×0.5"×0.185", separated by a teflon film, were placed in the mold and heated to 250° C. The prepolymer melt synthesized as described above in Example 1 with 1.5% curing additive was poured over the metal foam and degassed for about 15 min. with periodic venting to ensure a good flow of the resin throughout the metal foam. The mold was then heated in an air circulating oven for 9 h at 280° C. and cooled back to room temperature over a 3 h span. The mechanical and damping properties of the phthalonitrile/zinc composite samples were evaluated after heat treatment at the following conditions: (A) 9 h at 280° C. (B) 18 h at 280° C. (C) 18 h at 280, 4 h at 325° C. and (D) 18 h at 280, 4 h at 325, 4 h at 375° C. Conditions (C) and (D) employed an inert atmosphere purge of argon.

Example 7

Fabrication of Aluminum Alloy Foam/Rubber (White) Composite

An aluminum mold, 2"×0.6"×0.2", coated with a teflon mold release agent was used for fabrication of composite specimens. Two aluminum foam strips, 1"0.5"×0.185", separated by a teflon film, were placed in the mold. The aluminum foam strips were submerged in the polymeric uncured natural rubber dissolved in an organic solvent and with a small amount of peroxide to thermally cure the rubber. The composite was subjected to pressure to remove the solvent and to consolidate the composite fabrication. The impregnated uncured rubber/aluminum foam composition was heated at about 160° C. for 1-2 house to crosslink the rubber.

Example 8

Fabrication of Aluminum Alloy Foam/Red Rubber Composite

An aluminum mold, 2"×0.6"×0.2", coated with a teflon mold release agent was used for fabrication of composite specimens. Low viscosity uncured RTV silicone rubber was quickly placed in the mold and two aluminum foam strips, 1"×0.5"×0.185", separated by a teflon film, were submerged in the uncured rubber. The mold was then placed in a vacuum oven at reduced pressure for 15 minutes. The rubber was then cured at room temperature for 24 hours affording a rubber/aluminum foam composite.

Example 9

Fabrication of Epoxy/Aluminum Alloy Foam Composite

An aluminum mold, 2"×0.6"×0.2", coated with a teflon mold release agent was used for fabrication of composite specimens. Epon 828 and an aromatic diamine were mixed thoroughly and placed into the aluminum mold. Several aluminum foam strips, 1"×0.5×0.185", separated by a teflon film, were submerged in the epoxy/amine composition at approximately 100° C. in a vacuum oven. At this time, a vacuum was applied to consolidate the dispersion of the composition into the pores of the aluminum foam. The composition was cured by heating at 65° C. for 5-6 hours. The epoxy/aluminum foam composite was used for evaluating damping and mechanical properties.

Example 10

Fabrication of Acrylic/Aluminum Alloy Foam Composite

An aluminum mold, 3"×2" was used for fabrication of composite specimens. 18 ml of catalyst B was added to 40 ml of resin A of the EPO-KWICK components and thoroughly mixed. The mixture was poured on top of several aluminum foam strips, 1"0.5"×0.185", contained in the aluminum mold. At this time, a vacuum was applied for 10 minutes to degas and consolidate the dispersion of the composition into the pores of the aluminum foam. The composition was cured by keeping at room temperature overnight. The acrylic/aluminum alloy foam composite was used for evaluating damping and mechanical properties.

Example 11

Preparation of Porous Metal/Organic Polymeric Composite Samples for Damping Measurements For the purpose of demonstration, we have used selected foams and filler materials. Many metals or even high strength alloys can be used as skeleton material and also wide variety of filler materials can be used to design the composite possessing required strength and damping capability. Other factors such as environmental compatibility, temperature and chemical compatibility in addition to cost can dictate the choice of the materials to be used.

The composites produced in Examples 3-9 were used for damping measurements. The samples were prepared with dimensions having 4.5 mm thickness, 10 mm width, and 32 mm length. The damping capacity of the samples were measured with a dynamic mechanical thermal analyzer (DMTA). A small sinusoidal mechanical stress is applied to the sample and the resulting sinusoidal strain transduced. Comparison of the amplitude of the signals yields the complex dynamic modulus E*. The phase lag (d) of strain behind stress is measured and the storage modulus and loss factor of the material are calculated.

Example 12

Damping Characteristics of Aluminum Alloy Foam/Phthalonitrile Composite

Figure 10:
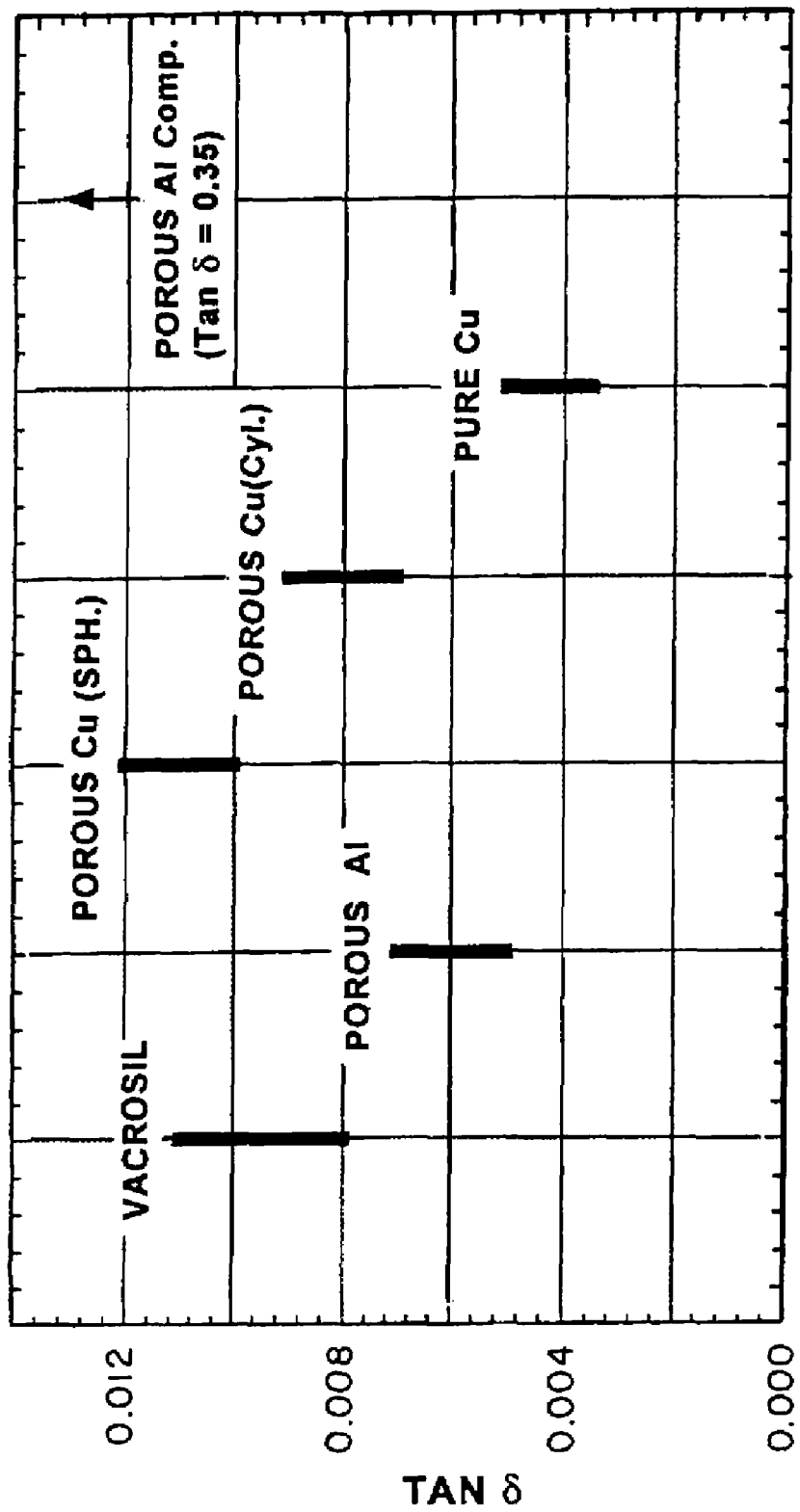
FIG. 10 is a graph showing the Tan$\delta$ over a frequency range of 0.1 to 10 Hz for various polymers and metal foams.

The aluminum alloy foam/phthalonitrile composite prepared in Example 3 was evaluated for its damping characteristics under 1 Hz frequency. The results of the damping measurements were shown in FIG. 1. The figure shows the damping behavior of the composite under different heat treatment conditions as described in Example 3. The damping measurements are plotted with temperature. It is noted that damping peak locations at a given temperature can be adjusted based on heat treatment of composite. The room temperature damping (flat portion of curve) is also higher than the best damping material such as Vacrosil™ as shown in FIG. 10.

Example 13

Damping Characteristics of Copper Foam/Phthalonitrile Composite

Figure 2:
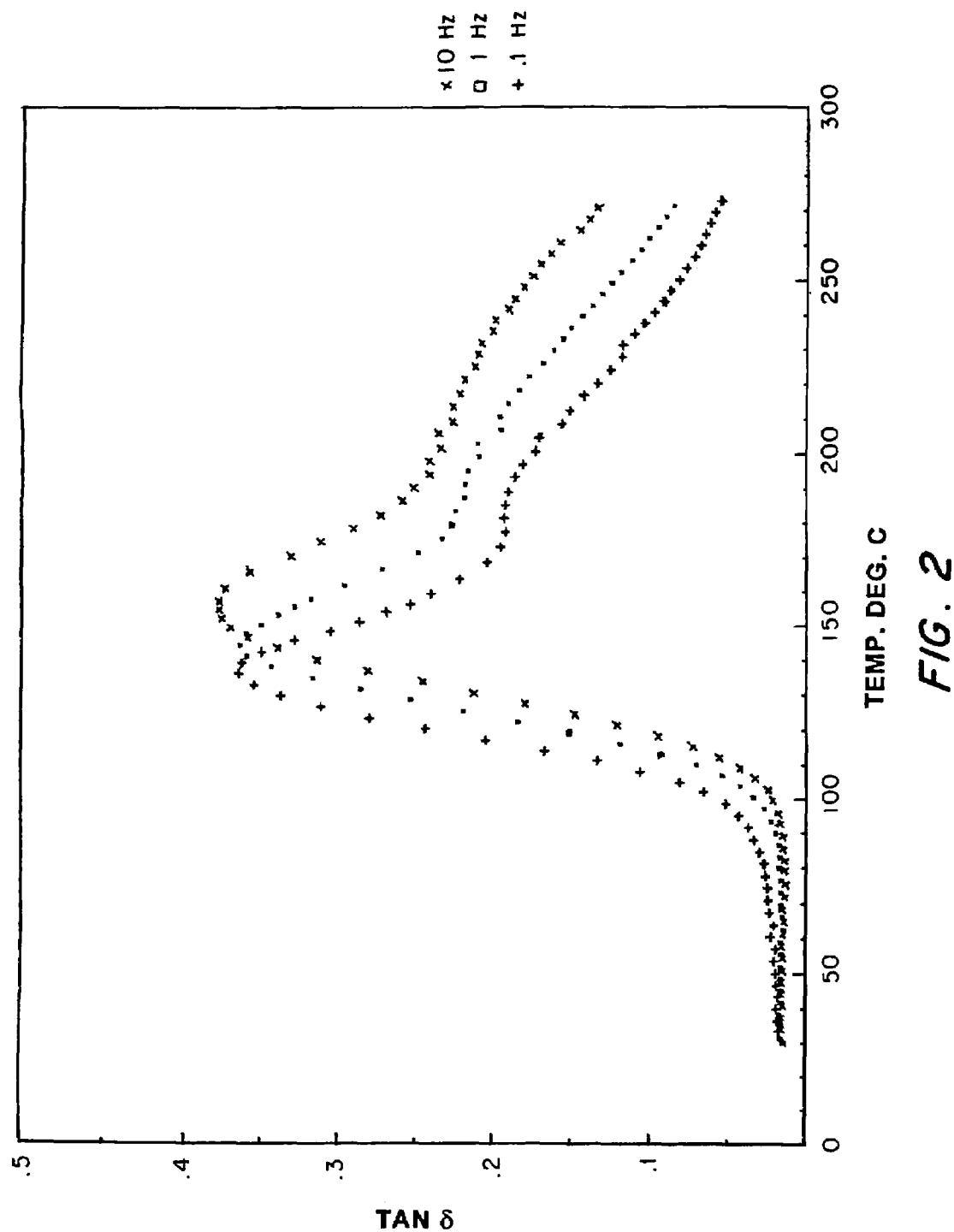
FIG. 2, FIG. 3 and FIG. 4 show the results of damping measurements for a copper foam/phthalonitrile composite, over a frequency range of 0.1 to 10 Hz.
Figure 3:
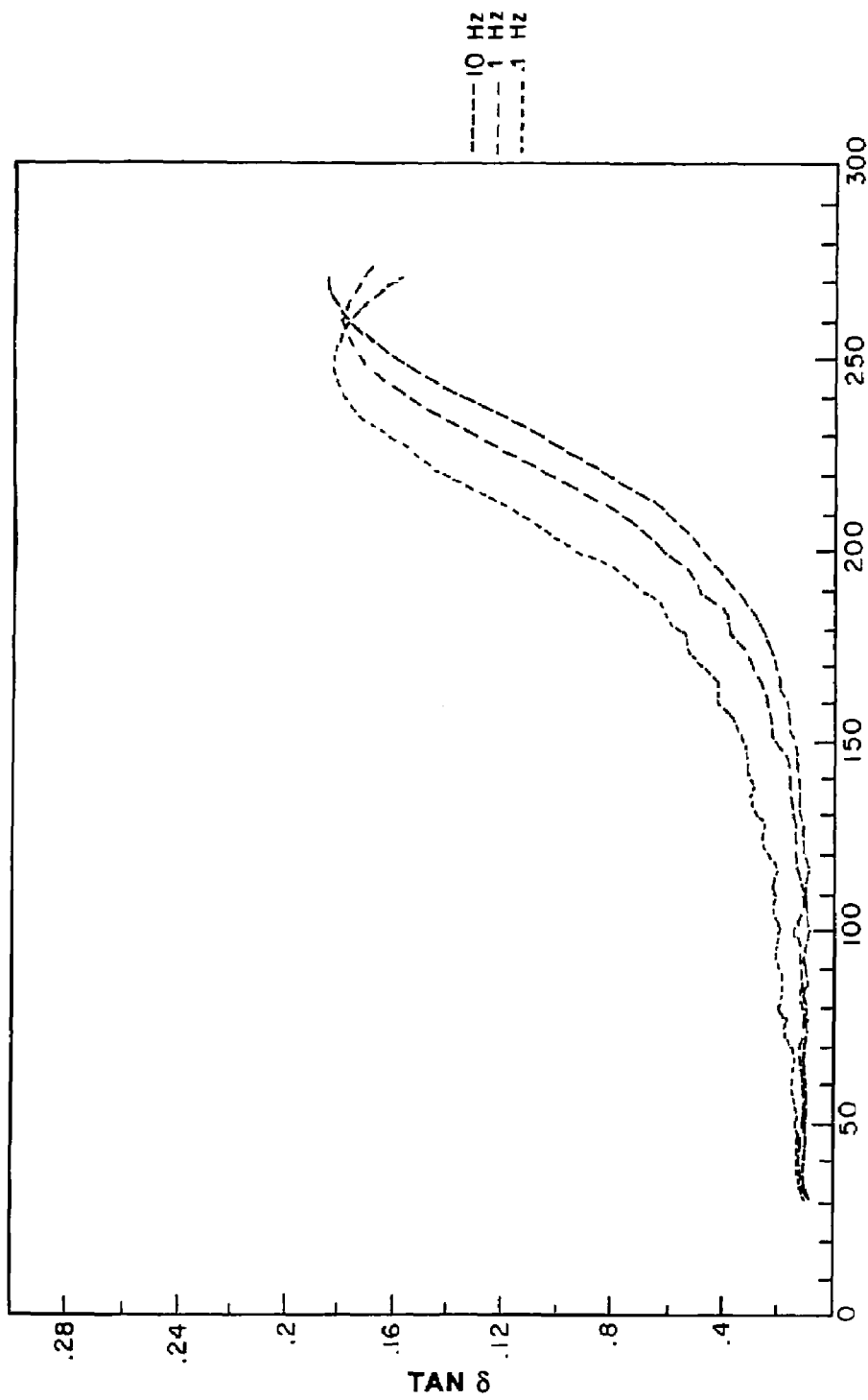
Figure 4:
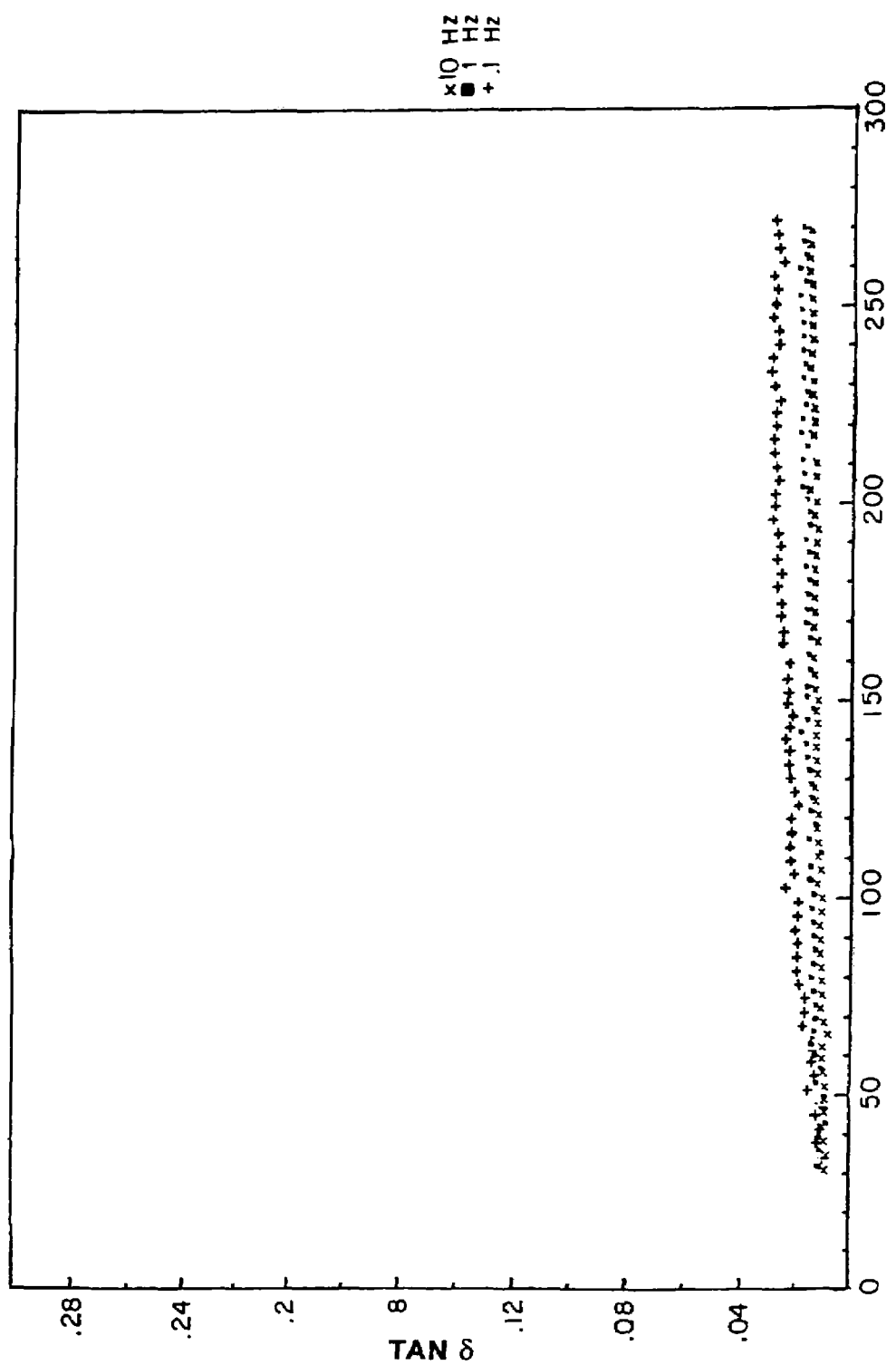

The copper foam/phthalonitrile composite prepared in Example 4 was evaluated for its damping characteristics under 0.1 to 10 Hz frequency. The results of the damping measurements were shown in FIG. 2, FIG. 3, and FIG. 4. The figures show the damping behavior of the composite under different heat treatment conditions as described in Example 4. The damping measurements are plotted with temperature. It is noted that damping peak locations at a given temperature can be adjusted based on heat treatment of the composite. The room temperature damping (flat portion of curve) is also higher than the best damping material such as Vacrosil™ as shown in FIG. 10.

Example 14

Damping Characteristics of Titanium Foam/Phthalonitrile Composite

Figure 5:
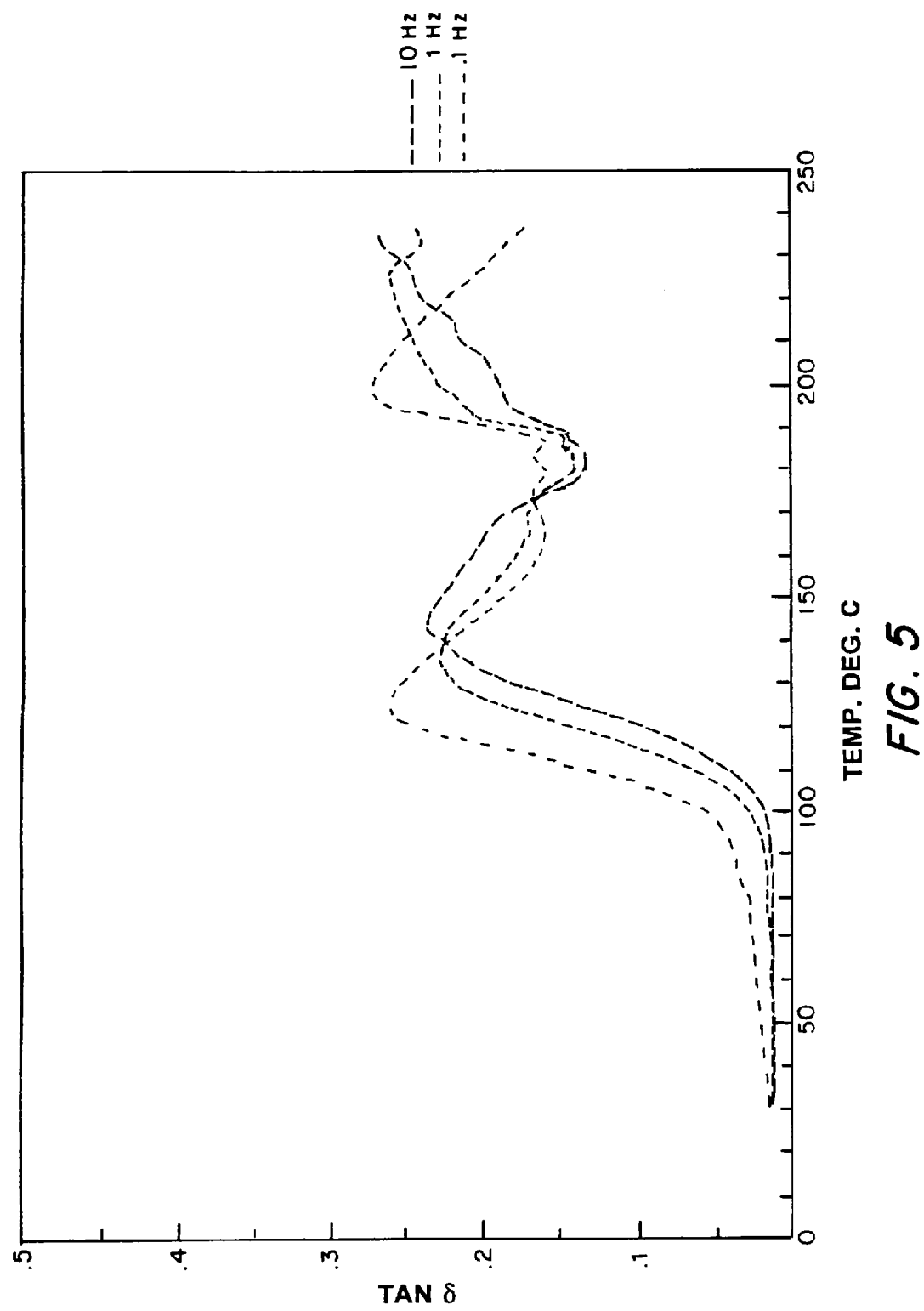
FIG. 5, FIG. 6, and FIG. 7 show the damping behavior of a titanium foam/phthalonitrile composite under different heat treatment conditions as described in Example 5.
Figure 6:
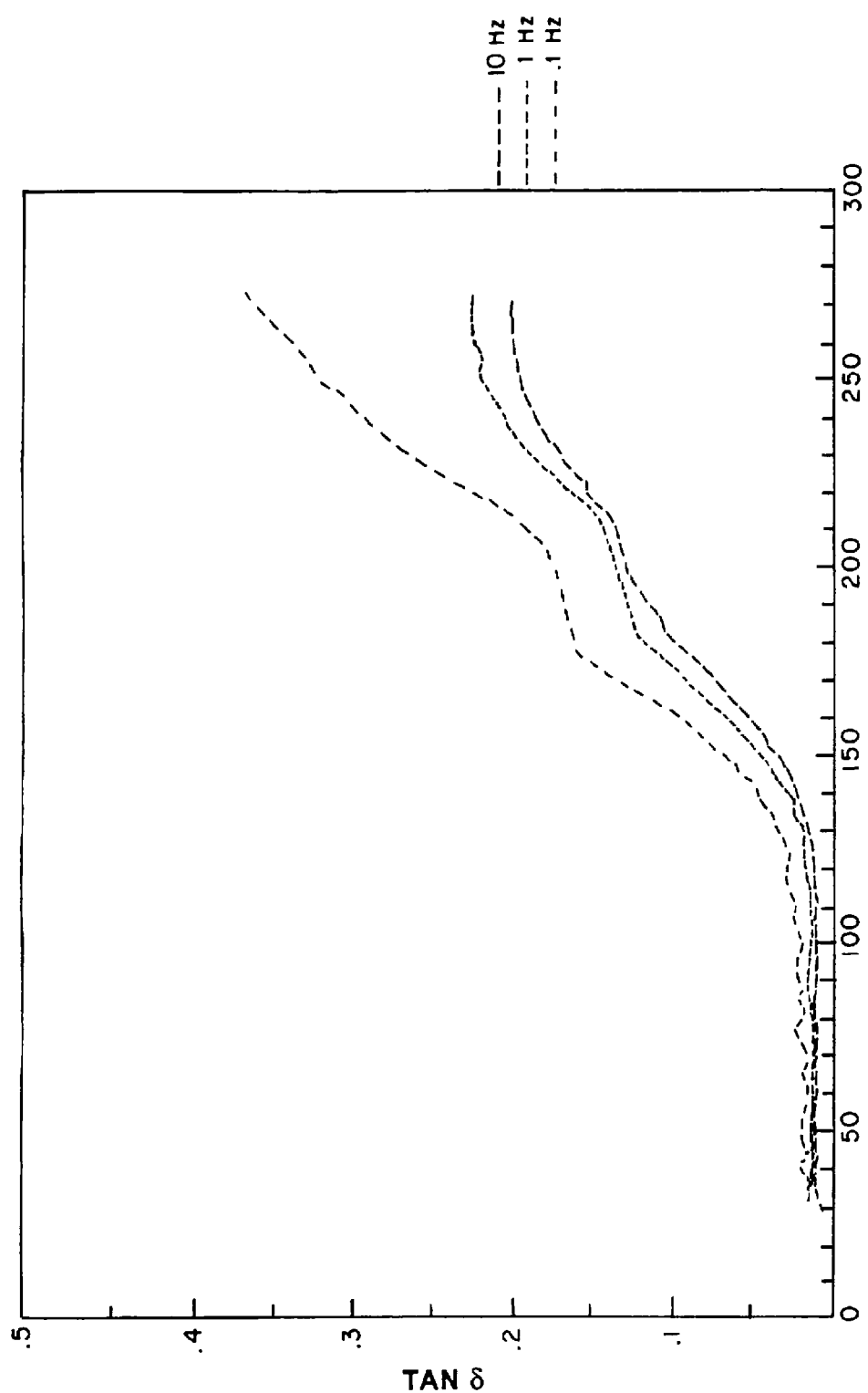
Figure 7:
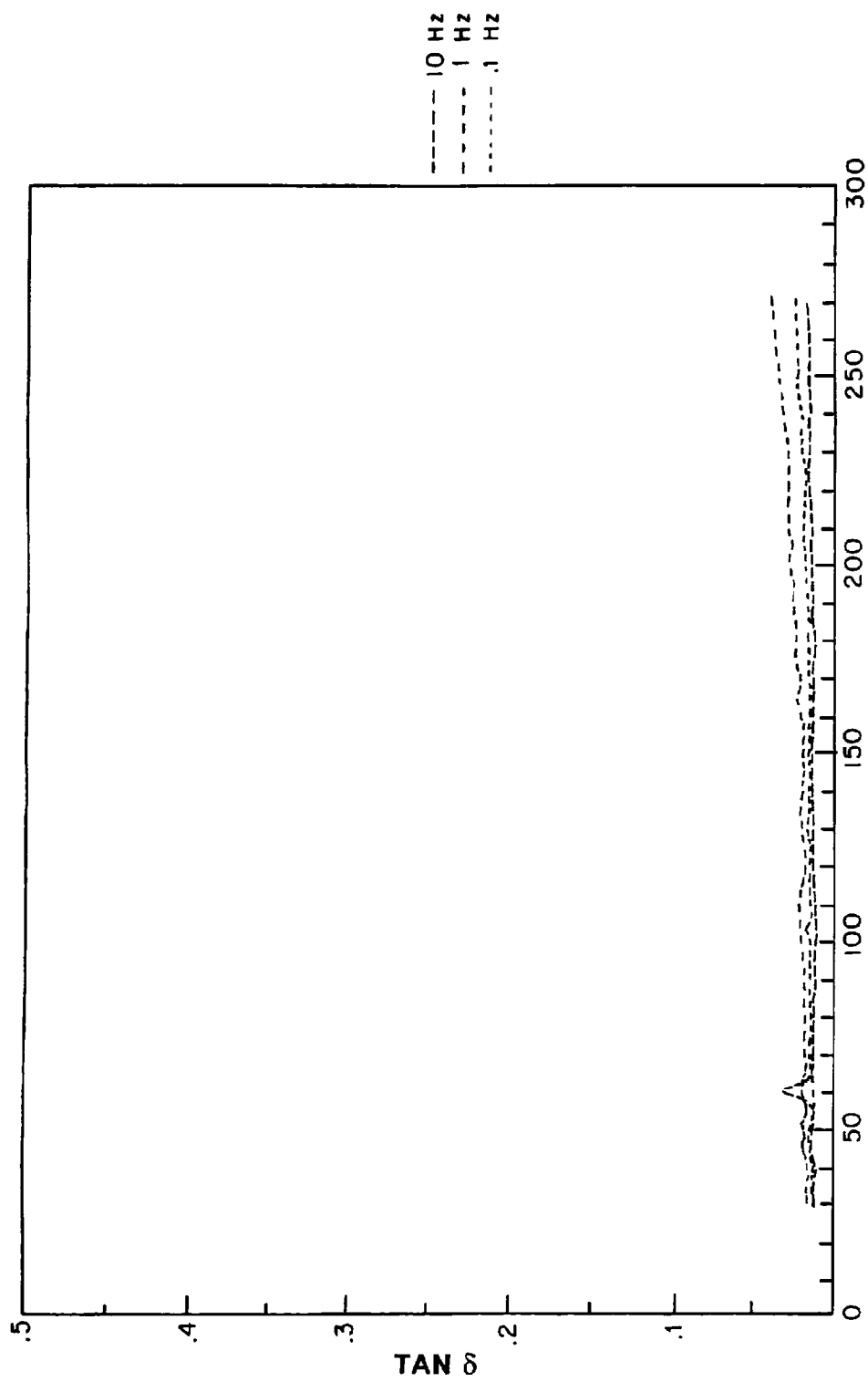

The titanium foam/phthalonitrile composite prepared in Example 5 was evaluated for its damping characteristics under 0.1 to 10 Hz frequency. The results of the damping measurements were shown in FIG. 5, FIG. 6, and FIG. 7. The figures show the damping behavior of the composite under different heat treatment conditions as described in Example 5. The damping measurements are plotted with temperature. It is noted that damping peak locations at a given temperature can be adjusted based on heat treatment of the composite. The room temperature damping (flat portion of curve) is also higher than the best damping material such as Vacrosil™ as shown in FIG. 10.

Example 15

Damping Characteristics of Zinc Foam/Phthalonitrile Composite

Figure 8:
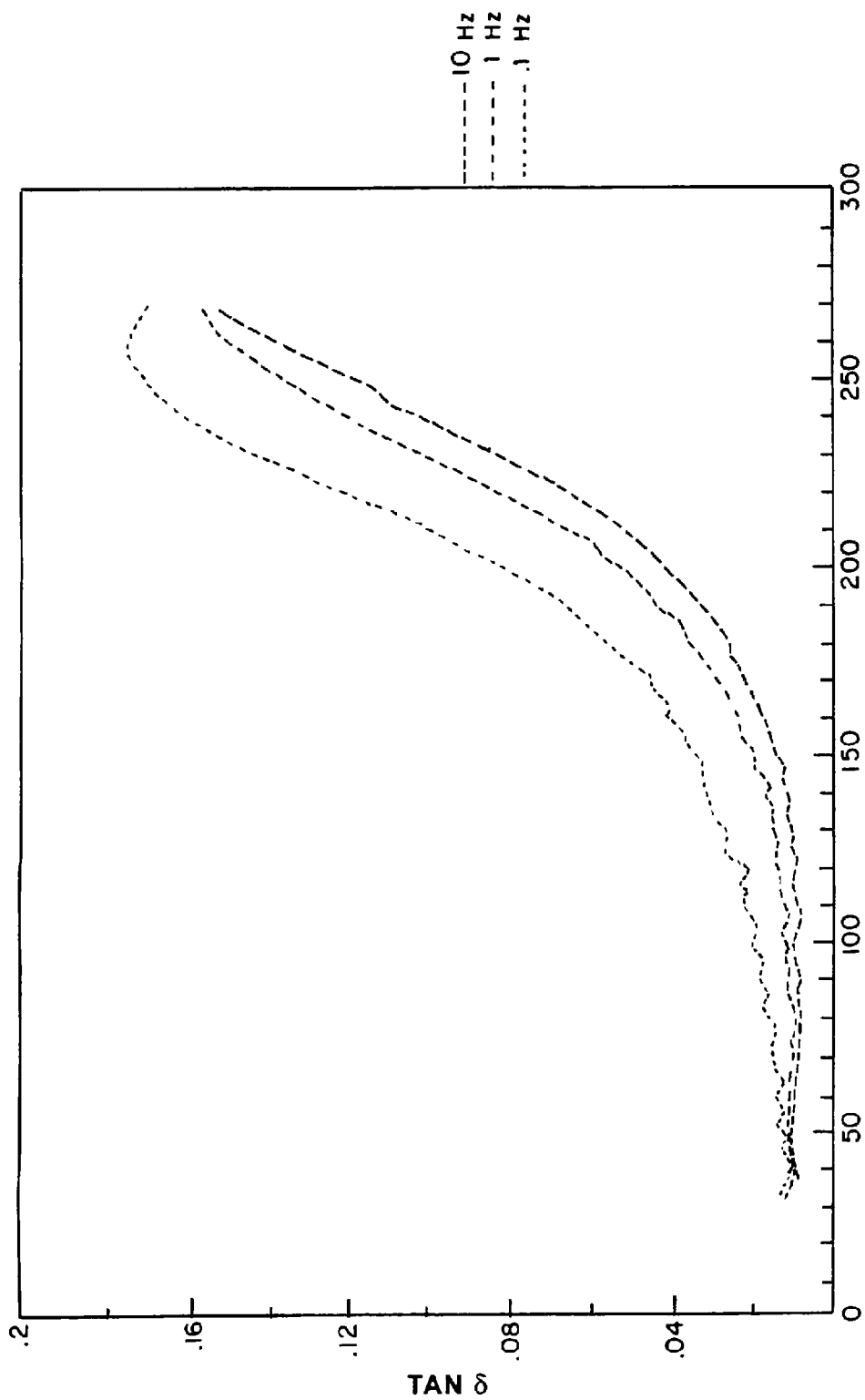
FIG. 8 and FIG. 9 show the damping behavior of a zinc foam/phthalonitrile composite under different heat treatment conditions as described in Example 5.
Figure 9:
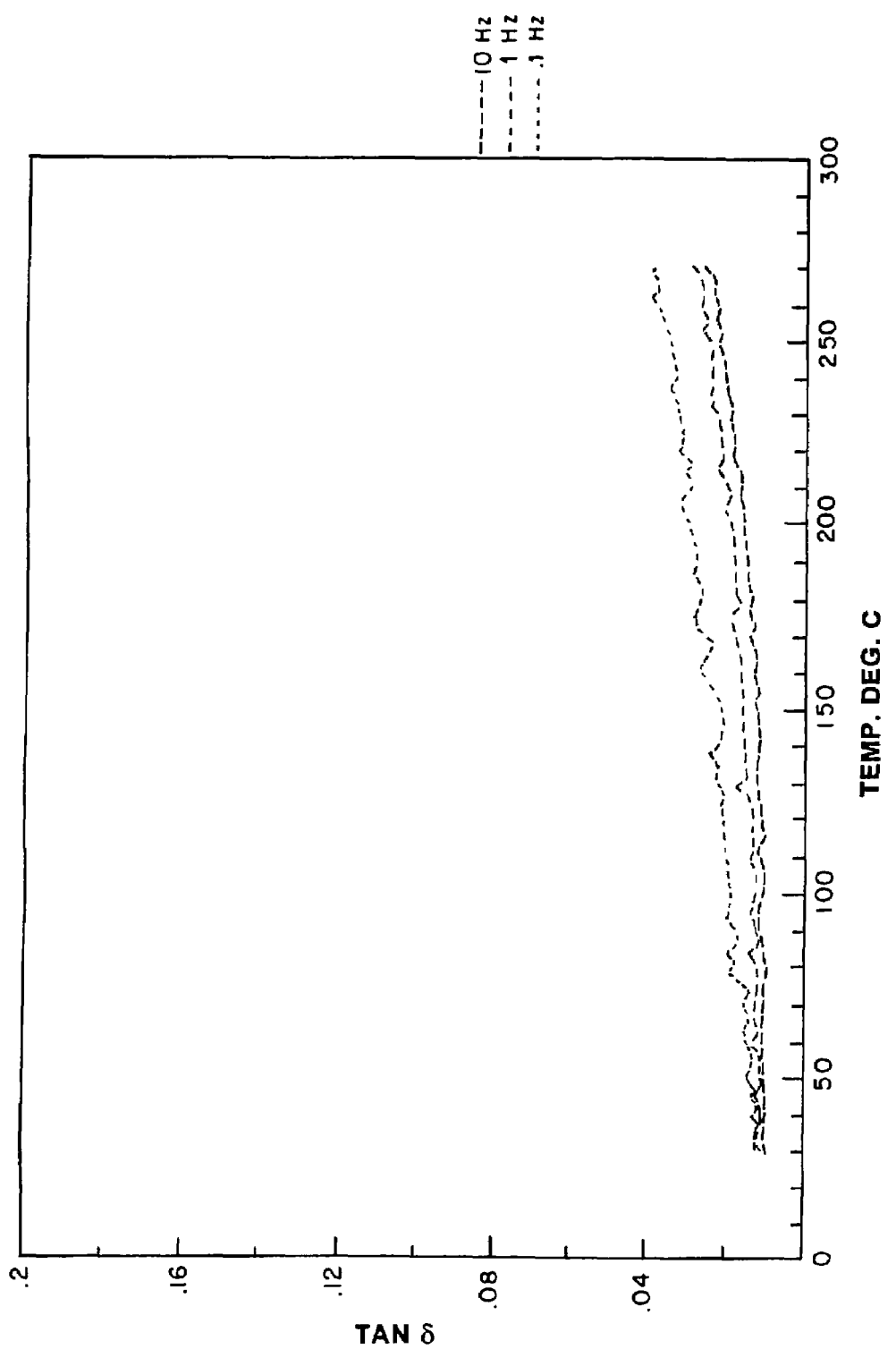

The zinc foam/phthalonitrile composite prepared in Example 6 was evaluated for its damping characteristics under 0.1 to 10 Hz frequency. The results of the damping measurements were shown in FIG. 8 and FIG. 9. The figures show the damping behavior of the composite under different heat treatment conditions as described in Example 5. The damping measurements are plotted with temperature. It is noted that damping peak locations at a given temperature can be adjusted based on heat treatment of the composite. The room temperature damping (flat portion of curve) is also higher than the best damping material such as Vacrosil™ as shown in FIG. 10.

Example 16

Damping Characteristics of Aluminum Alloy Foam/White Rubber Composite

Figure 11:
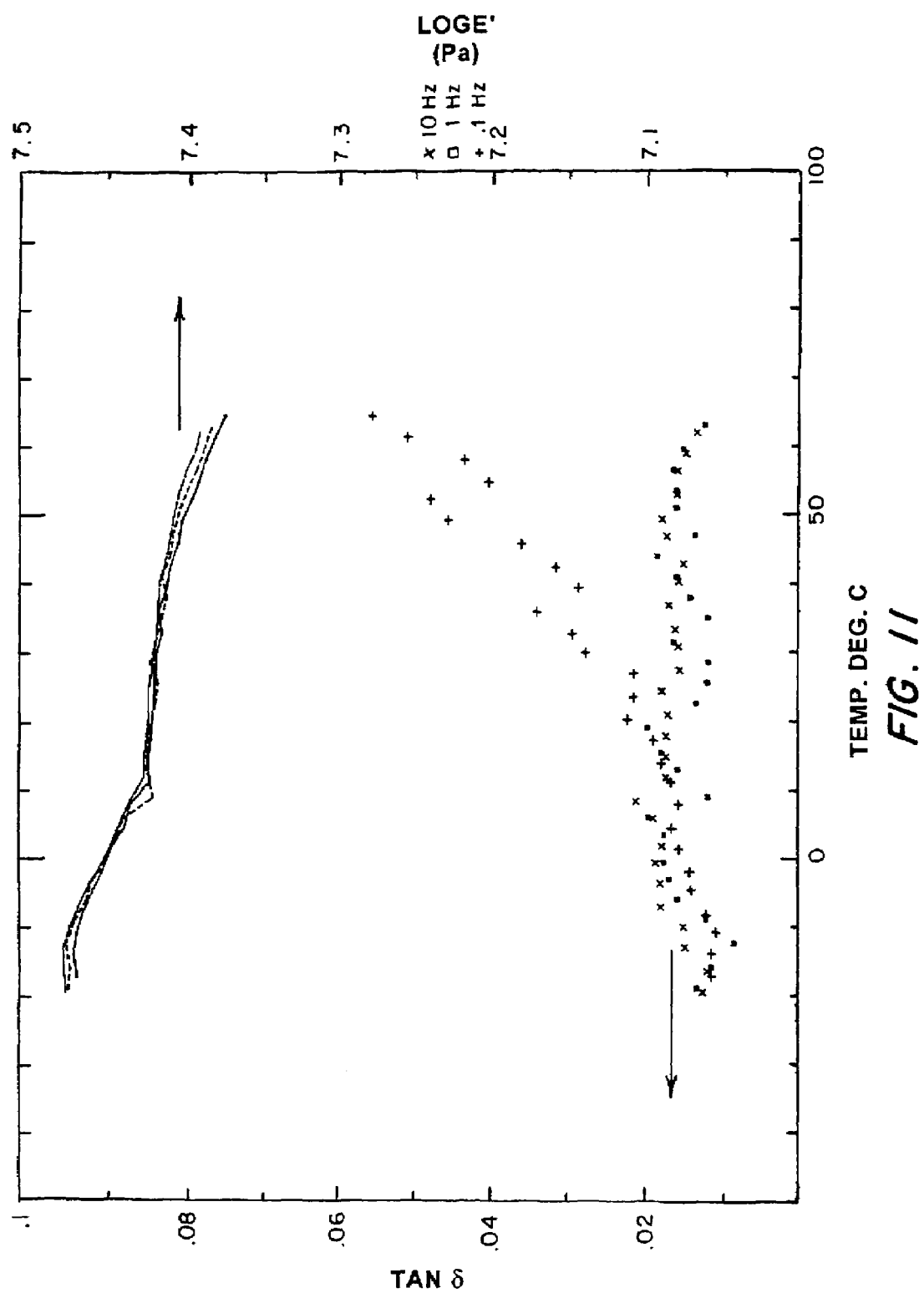
FIG. 11 shows the damping behavior of a white rubber/aluminum alloy foam over the frequency range of 0.1 to 10 Hz.

The aluminum alloy foam/white composite prepared in Example 7 was evaluated for its damping characteristics under 0.1 to 10 Hz frequency. The results of the damping measurements were shown in FIG. 11. This figure shows the damping behavior of the composite. The damping measurements are plotted with temperature. It is noted that damping characteristics are better than the best damping material such as Vacrosil™ as shown in FIG. 10.

Example 17

Damping Characteristics of Aluminum Alloy Foam/Red Rubber Composite

Figure 12:
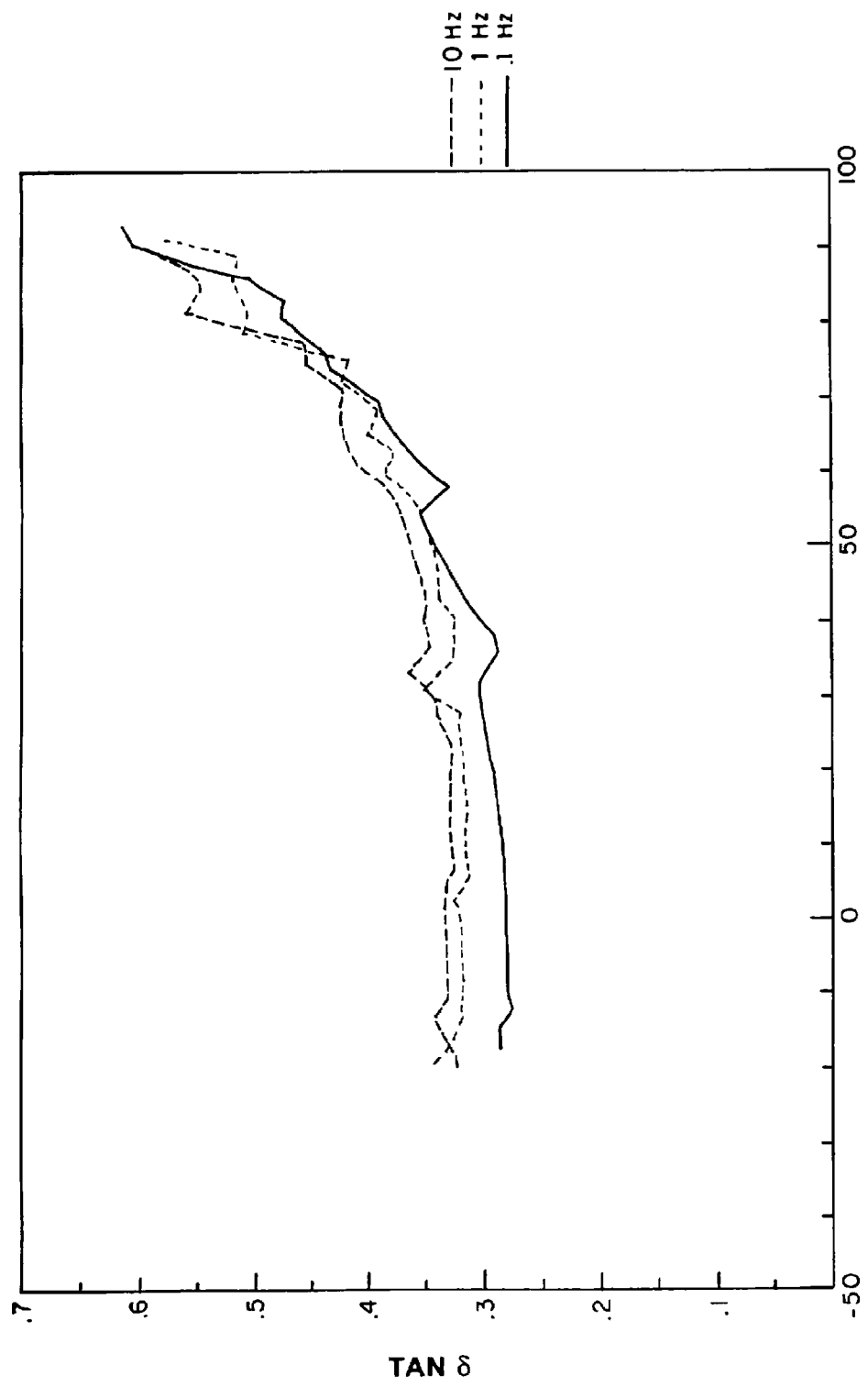
FIG. 12 shows the damping behavior of a red rubber/aluminum alloy foam over the frequency range of 0.1 to 10 Hz.

The Aluminum Alloy Foam/red rubber composite prepared in Example 8 was evaluated for its damping characteristics under 0.1 to 10 Hz frequency. The results of the damping measurements were shown in FIG. 12. This figure shows the damping behavior of the composite. The damping measurements are plotted with temperature. It is noted that damping characteristics are better than the best damping material such as Vacrosil™ as shown in FIG. 10.

Example 18

Damping Characteristics of Aluminum Alloy Foam/Epoxy Composite

Figure 13:
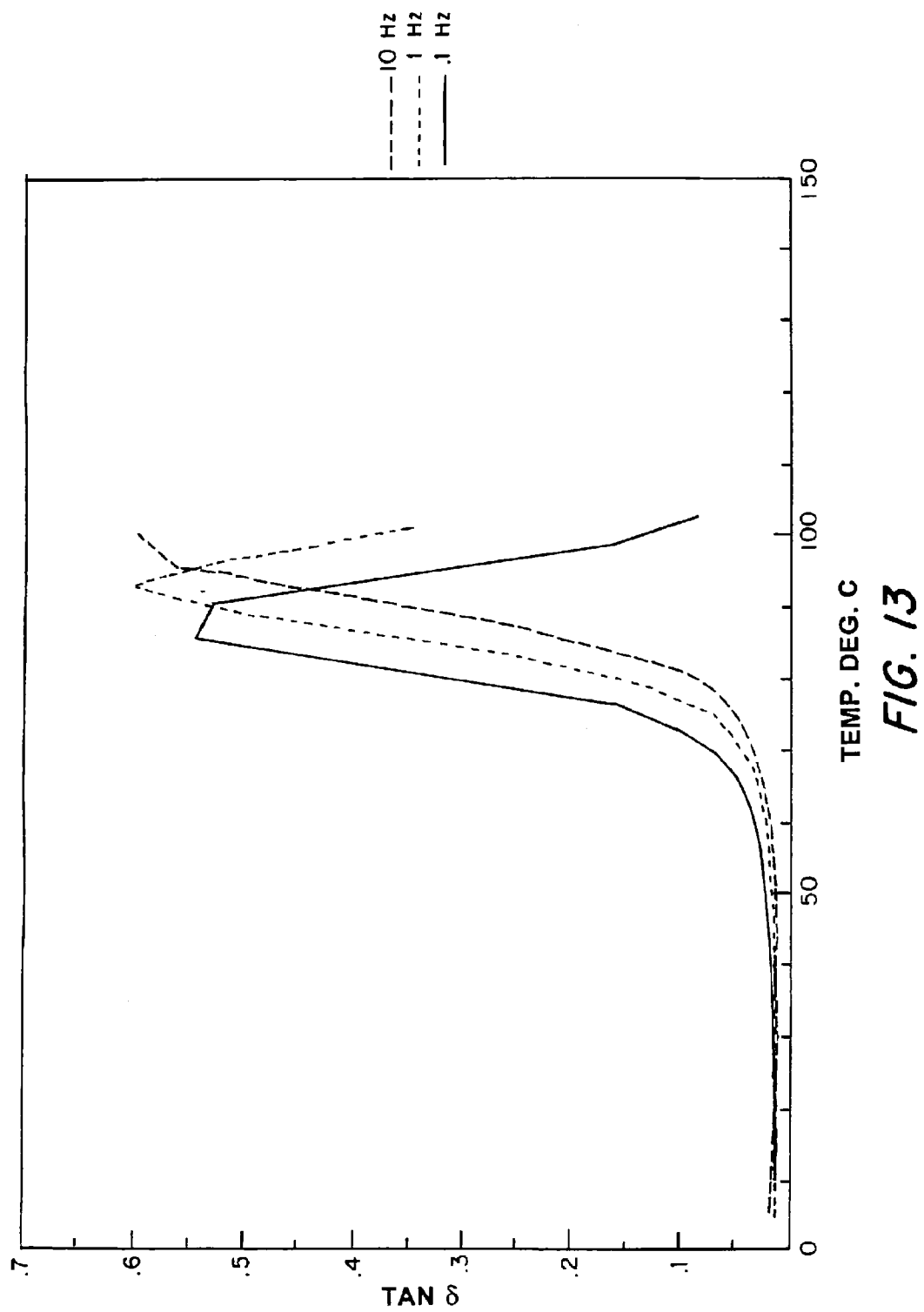
FIG. 13 shows the damping behavior of an epoxy/aluminum alloy foam over the frequency range of 0.1 to 10 Hz.

The Aluminum Alloy Foam/epoxy composite prepared in Example 8 was evaluated for its damping characteristics under 0.1 to 10 Hz frequency. The results of the damping measurements were shown in FIG. 13. This figure shows the damping behavior of the composite. The damping measurements are plotted with temperature. It is noted that damping characteristics are better than the best damping material such as Vacrosil™ as shown in FIG. 10.

Example 19

Damping Characteristics of Aluminum Alloy Foam/Acrylic Composite

Figure 14:
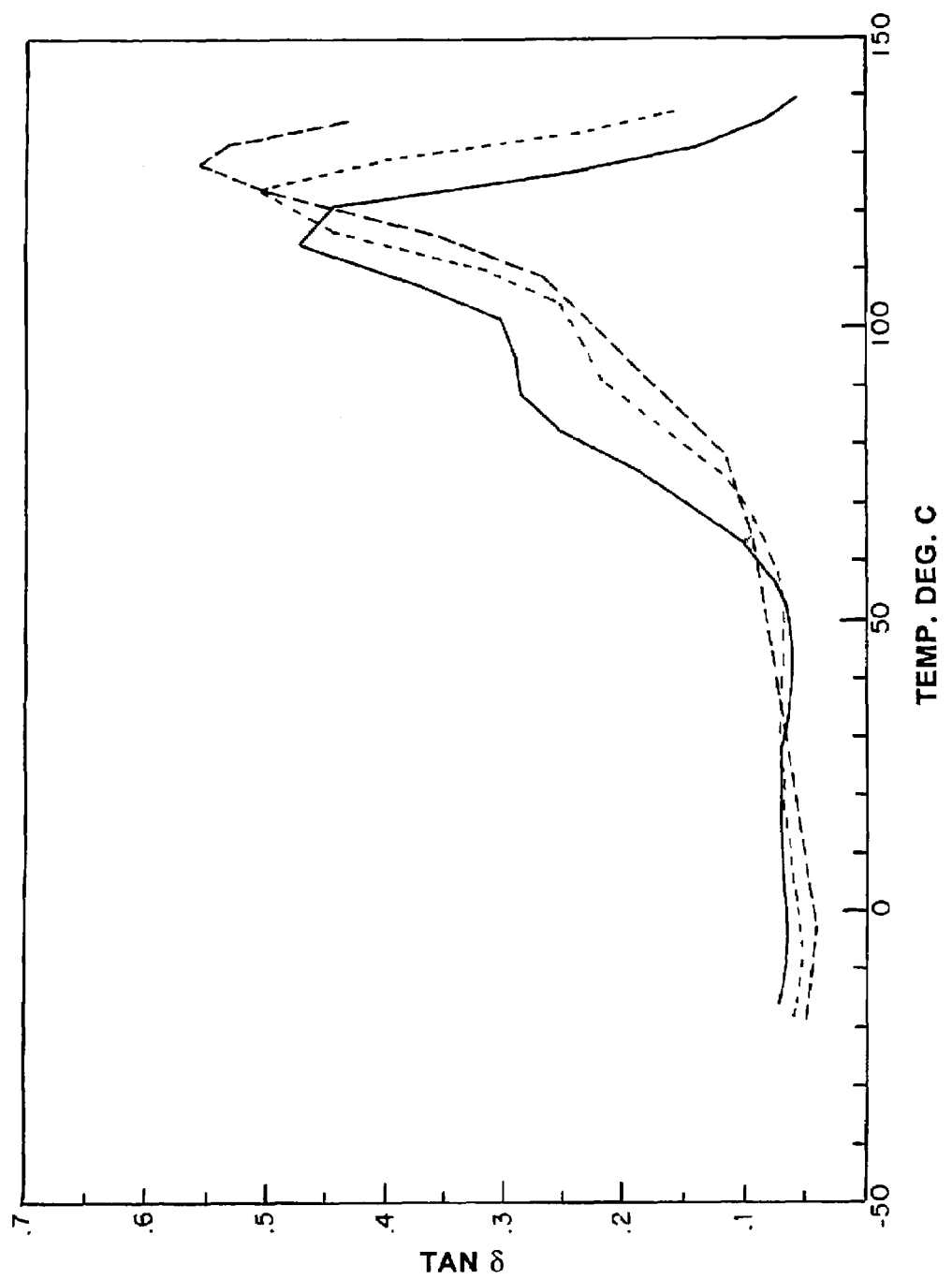
FIG. 14 shows the damping behavior of an acrylic polymer/aluminum alloy foam over the frequency range of 0.1 to 10 Hz.

The Aluminum Alloy Foam/Acrylic composite prepared in Example 10 was evaluated for its damping characteristics under 0.1 to 10 Hz frequency. The results of the damping measurements were shown in FIG. 14. The figure shows the damping behavior of the composite. The damping measurements are plotted with temperature. It is noted that damping characteristics are better than the best damping material such as Vacrosil™ as shown in FIG. 10.

Example 20

Mechanical Properties of Aluminum Alloy Foam/Phthalonitrile Composite

Figure 15:
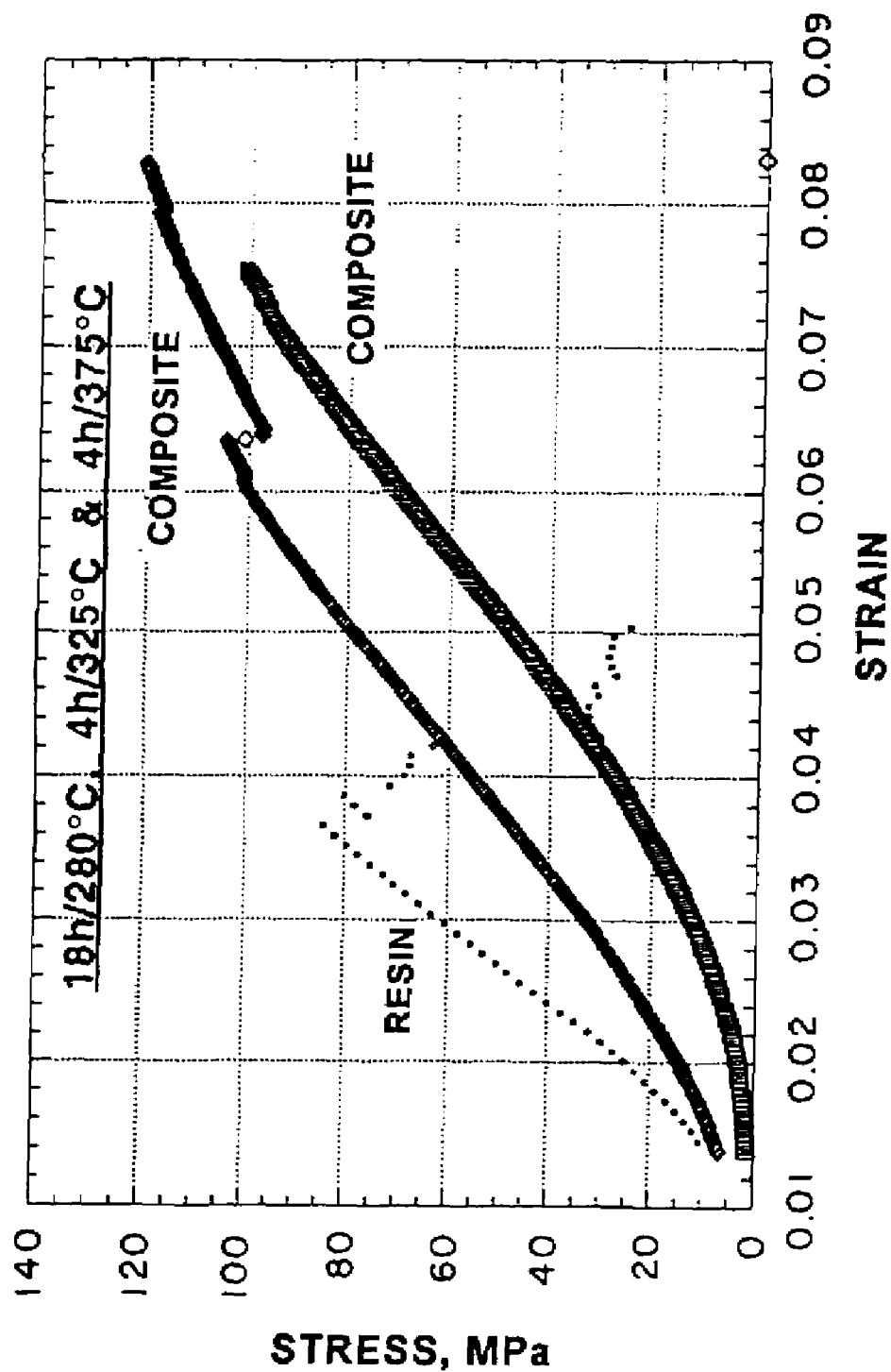
FIG. 15 shows the stress/strain diagram for an aluminum alloy foam/phthalonitrile composite that was heat treated at 280° C. for 18 hours, at 325° C. for 4 hours, and at 375° C. for 4 hours.

The aluminum alloy foam/phthalonitrile composite prepared in Example 3 was evaluated for its room temperature compressive mechanical properties after various heat treatment exposures. For example, FIG. 15 shows the stress/strain diagram for the composite which was heat treated at 280° C. for 18 hours, at 325° C. for 4 hours, and at 375° C. for 4 hours. The figure shows that the composite exhibit superior mechanical properties relative to the cured phthalonitrile resin.

Example 21

Mechanical Properties of Aluminum Foam/Acrylic Composite

Figure 16:
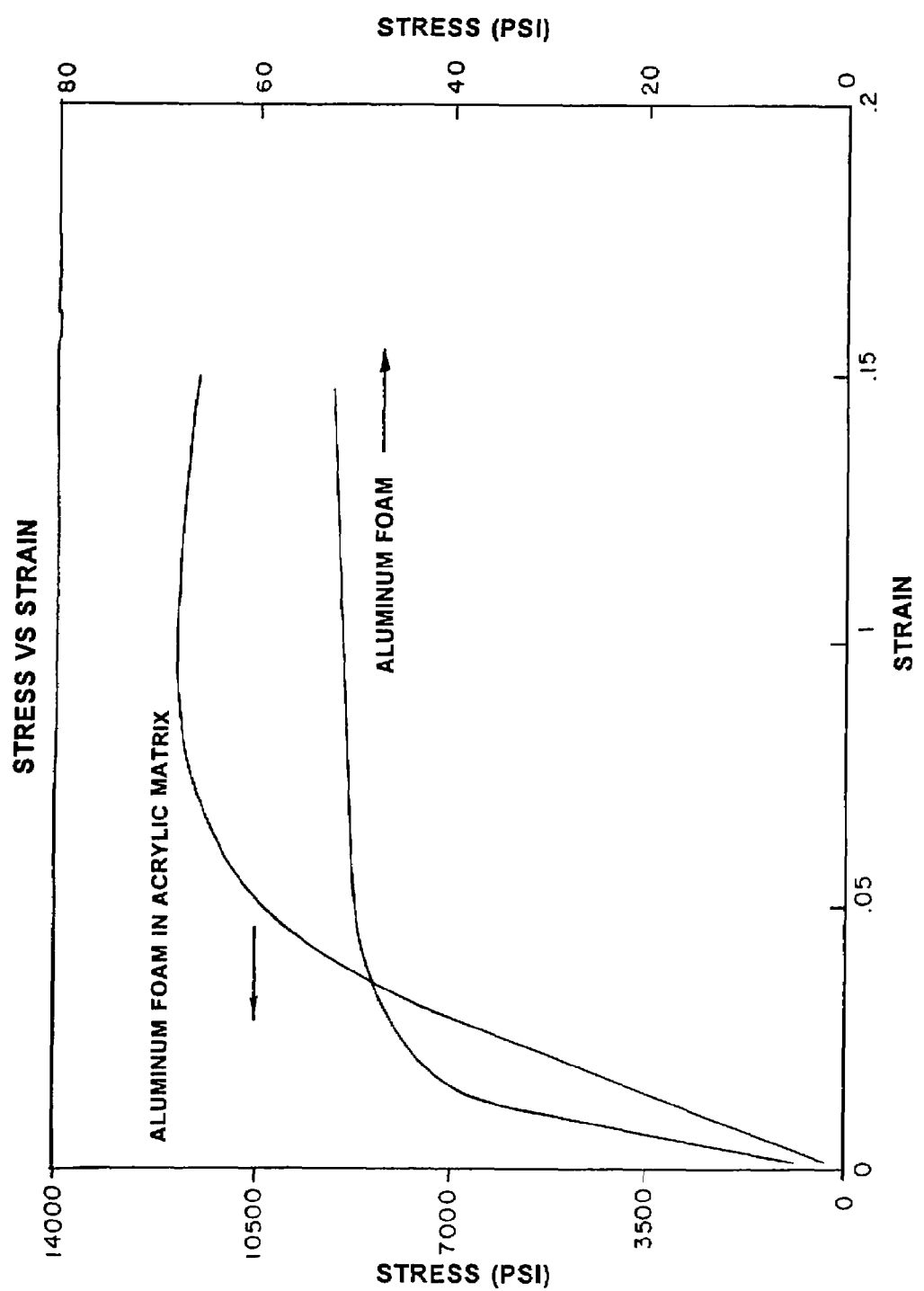
FIG. 16 shows the stress/strain diagram for an aluminum alloy foam/acrylic composite.

The aluminum alloy foam/Acrylic composite prepared in Example 10 was evaluated for its room temperature compressive mechanical properties after various heat treatment exposures. For example, FIG. 16 shows the stress/strain diagram for the composite. The figure shows that the composite exhibit superior mechanical properties relative to the aluminum alloy foam.

Additional information concerning the present invention may be found in the copending United States Patent Application of Imam, Sastri and Keller, entitled LIGHTWEIGHT HIGH DAMPING POROUS METAL/PHTHALONITRILE COMPOSITES, filed on even date herewith, the entirety of which is incorporated herein by reference.

Obviously, many modifications and variations of the present invention are possible in light of the above teachings. It is therefore to be understood that, within the scope of the appended claims, the invention may be practiced otherwise than as specifically described.

What is claimed is:

1. An acoustically damping composite article comprising:
a non-elastomeric polymeric matrix having therein a metal foam, said metal foam having an open cell structure, said metal foam being impregnated with said polymeric matrix so as to completely penetrate said open cell structure of said foam and fill the cells thereof; and
optionally, one or more additional components selected from a catalyst, a curing agent, a curing additive, and a release agent,
wherein the article comprises from about 60 to about 95 vol. % of the polymeric matrix.

2. The composite article of claim 1, wherein said metal is selected from the group consisting of aluminum, aluminum base alloys, titanium, titanium base alloys, nickel, nickel base alloys, copper, copper base alloys, iron, iron base alloys, zinc, zinc base alloys, lead, lead base alloys, silver, silver base alloys, gold, gold base alloys, platinum, platinum base alloys, tantalum, and tantalum base alloys.

3. The composite article of claim 1, wherein said polymer is selected from the groups consisting of epoxies, acrylics, hardened silicones, polyurethanes, polyimides, polyvinyls, polycarbonates, hardened natural rubbers, hardened synthetic rubbers, phenolics, polyolefins, polyamides, polyesters, fluoropolymers, poly(phenylene ether ketones), poly(phenylene ether sulfones), poly(phenylene sulfides) and melamine-formaldehyde resins.

4. The composite article of claim 3, wherein said metal is an aluminum foam or an aluminum base alloy foam.

5. The composite article of claim 3, wherein said metal is a copper foam or a copper base alloy foam.

6. The composite article of claim 3, wherein said metal is a zinc foam or a zinc base alloy foam.

7. The composite article of claim 3, wherein said metal is a titanium foam or a titanium base alloy foam.

8. The composite article of claim 1, wherein said metal is an aluminum base alloy foam.

9. The composite article of claim 1, wherein said metal is a copper foam or a copper base alloy foam.

10. The composite article of claim 1, wherein said metal is a zinc foam or a zinc base alloy foam.

11. The composite article of claim 1, wherein said polymer is an epoxy.

12. The composite article of claim 1, wherein said polymer is an acrylic.

13. The composite article of claim 1, wherein said polymer is a hardened silicone rubber.

14. The composite article of claim 1, wherein said polymer is a hardened natural rubber.

15. The composite article of claim 1, wherein said polymer is a hardened synthetic non-silicone rubber.

16. The composite article of claim 1, wherein said polymer is a phenolic.

17. The composite article of claim 1, wherein said cells have a locally uniform diameter.

18. The composite article of claim 1, wherein said metal foam has a gradation of pores sizes in at least one direction along the metal foam.

19. A composite article according to claim 1, wherein said composite article is in the form of a sheet.

20. A laminate comprising a stack of sheets according to claim 19 bonded together.

21. The composite article of claim 1, wherein the composite consists of the non-elastomeric polymeric matrix having therein a metal foam and optionally, one or more additional components selected from a catalyst, a curing agent, a curing additive, and a release agent.

22. The composite article of claim 1, wherein the article comprises from about 92 to about 94 vol. % of the polymeric matrix.

23. An acoustically damping composite article comprising:
a polymeric matrix having therein a metal foam, said metal foam being impregnated with said polymeric matrix so as to completely penetrate said open cell structure of said foam and fill the cells thereof, said metal foam thickness no smaller than 3 times the average diameter of said cells; and optionally, one or more additional components selected from a catalyst, a curing agent, a curing additive, and a release agent, wherein the article comprises from about 60 to about 95 vol. % of the polymeric matrix.

24. The composite article of claim 23, wherein the composite consists of the non-elastomeric polymeric matrix having therein a metal foam and optionally, one or more additional components selected from a catalyst, a curing agent, a curing additive, and a release agent.

25. The composite article of claim 23, wherein the article comprises from about 92 to about 94 vol. % of the polymeric matrix.

26. A method of forming a composite comprising the steps of:

impregnating a metal foam, said metal foam having an open cell structure, with a resin component and optionally, one or more additional components selected from a catalyst, a curing agent, a curing additive, and a release agent so as to completely penetrate said open cell structure of said foam and fill the open cells of said metal foam with said resin component; and converting said resin component, within said cells, to a bulk solid, non-elastomeric polymerized resin, thus forming a composite comprising:

a matrix of said non-elastomeric polymerized resin, said matrix having therein said metal foam and the optional additional component, wherein the composite comprises from about 60 to about 95 vol. % of the matrix.

27. The method of claim 26, wherein the composite consists of the non-elastomeric polymeric matrix having therein a metal foam and optionally, one or more additional components selected from a catalyst, a curing agent, a curing additive, and a release agent.

28. The method of claim 26, wherein the composite comprises from about 92 to about 94 vol. % of the matrix.

* * * * *